Oct. 8, 1935.  A. C. HAIGHT  2,016,329
METHOD OF MAKING MOLDED ARTICLES FROM WOOD PASTE OR THE LIKE
Filed Sept. 5, 1934

Inventor:
Auletus C. Haight
By Macleod, Calver, Copeland & Dike
Attorneys.

Patented Oct. 8, 1935

2,016,329

UNITED STATES PATENT OFFICE 2,016,329

METHOD OF MAKING MOLDED ARTICLES FROM WOOD PASTE OR THE LIKE

Auletes Clark Haight, New York, N. Y., assignor to The A. S. Boyle Company, Cincinnati, Ohio, a corporation of Ohio Application September 5, 1934, Serial No. 742,791

10 Claims. (Cl. 18—55)

This invention relates to molding a material of a plastic character. One such material includes finely divided wood or other cellulosic material and a solution of nitrocellulose or other cellulose ester, resins, oils, and a volatile solvent and is described in the patent to Manfred E. Griffiths, No. 1,838,618, dated December 29, 1931. Such a material will be referred to throughout this specification and the appended claims as a wood paste. Heretofore, it has been impossible to mold wood paste satisfactorily because of its great adhesive power causing it to stick to the mold and because of shrinkage causing distortion of the molded object.

It is an object of the present invention to provide a method by which such wood paste may be molded without the above mentioned difficulties.

In accordance with the invention a moldable material is formed by mixing with the wood paste a water soluble material, such as sodium chloride, preferably in fine granular form. The wood paste containing the water soluble material is then placed in a mold, preferably a porous mold saturated with water and the wood paste is subjected to the action of water until it has set so that the mold can be removed. The mold is then removed, preferably while supporting the molded wood paste in water and the molded object hardened. Preferably, the molded object is hardened by permitting it to remain in water until substantially all the volatile solvent has been displaced by the water and the water is then dried out.

The invention will be more clearly understood from the following description in conjunction with the accompanying drawing; in which, Fig. 1 is a perspective view of one of the sections of a suitable mold for forming a molded object of wood paste;

Figure 1:
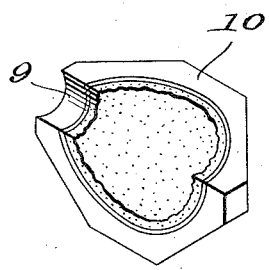
Figure 2:
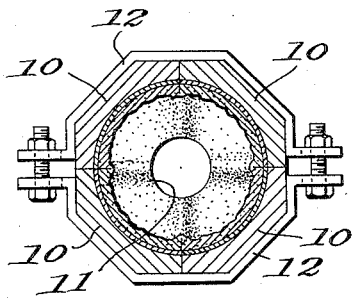
Fig. 2 is a sectional view of the mold with the sections assembled.

A suitable mold for use in practicing the invention, as illustrated in the accompanying drawing, comprises a plurality of mold sections 10, of which there are four, each formed of a porous material, such as plaster-of-Paris. The mold sections adapted to be assembled, as shown in Fig. 2, provide a continuous substantially globular interior surface. The edge of each mold section is cut away at 9 to provide an opening 11 permitting access to the interior of the mold when the mold sections are assembled. The mold sections may be clamped in their assembled position by any suitable clamp 12.

In preparing the mold for molding an object of wood paste a thin coating of a greasy material, such as vaseline or oil, is applied upon the interior of each of the mold sections 10. The mold sections are then thoroughly saturated with a liquid which is inert toward the wood paste, such as water.

A wood paste may comprise 55 per cent of volatile solvent made by mixing equal parts of acetone and ethyl alcohol, 12 per cent of nitrocellulose, 10 per cent of resins and non-drying oil, and 23 per cent of wood flour by weight. It has been found that the wood paste is more suitable for molding if it is thoroughly mixed with a soluble material, such as sodium chloride. Preferably, the soluble material is granular and should pass through a 60 mesh screen. The sodium chloride or other soluble material is intimately mixed with the wood paste in about the proportion of four ounces of sodium chloride to one pound of wood paste.

Figure 3:
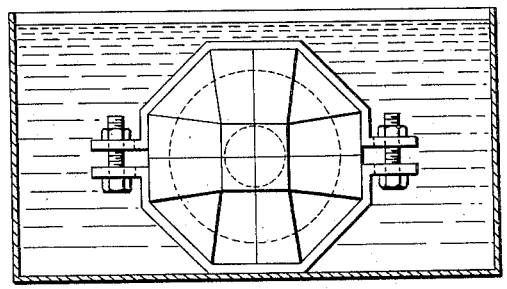
Fig. 3 is a sectional view of a vessel containing a liquid and illustrates one of the steps in the method of molding.
Figure 5:
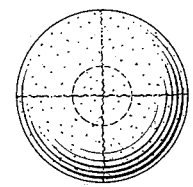
Fig. 5 is a view of the molded article.
Figure 4:
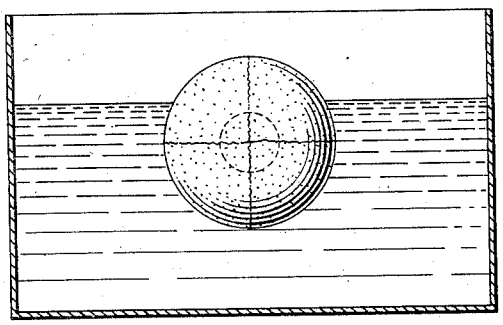
Fig. 4 is a view similar to Fig. 3 illustrating another step in the method.

In practicing the method of the invention, the wood paste containing the soluble material is applied in a thin layer upon the interior surface of each of the mold sections and a solvent for the binder of the wood paste is applied to the edges of the layers. The mold sections are now assembled and clamped in place as shown in Fig. 2 and the joints between the edges of the layers of wood paste are smoothed over with a tool or the like inserted through the opening 11 in the mold to make a bond at the edges. The mold is then immersed in a liquid, such as water, as shown in Fig. 3 and allowed to soak therein until the wood paste has set or acquired a leathery feel on the inside. The time required for the setting of the wood paste is about one-half hour. The mold is then removed gently from the molded object, care being taken to permit the object to remain in the water and be supported thereby while the last mold section is removed therefrom. The molded object is now allowed to remain in the water as shown in Fig. 4 for about one hour or until the volatile solvent of the wood paste has been substantially replaced by the water. The object is then removed from the water and dried.

The soluble material, such as the sodium chloride, is dissolved by the water leaving pores in the layer of wood paste, permitting the water to come into intimate contact with large areas of the wood paste causing it to congeal without shrinking. By saturating the mold with water before applying the layer of wood paste to its interior surface, air is prevented from contacting with the wood paste in contact with the interior surface of the mold to harden the wood paste and cause it to stick to the mold. The water also fills the pores of the mold so as to render it less porous. The use of the soluble material in the wood paste renders the finished molded object softer.

It will be understood that the invention is applicable for molding objects of various shapes, such as doll heads or manikin figures as well as flat objects. It will also be understood that liquids other than water may be employed for saturating the porous mold and for treating the wood paste to dissolve the soluble material mixed therewith and for displacing the volatile solvent of the wood paste.

The product above described is not claimed herein being covered by the claims of application Serial No. 7206, filed February 19, 1935, which is a division of the present application.

I claim:

1. The method of molding which comprises placing a wood paste containing a soluble material in a mold, subjecting the paste to the action of a liquid until it has set, removing the mold from the molded paste, and hardening the molded paste.

2. The method of molding which comprises saturating a porous mold with a liquid, placing a wood paste containing a soluble material in the mold, subjecting the paste to the action of a liquid until it has set, removing the mold from the molded paste, and hardening the molded paste.

3. The method of molding which comprises saturating a porous mold with a liquid, placing a wood paste containing a soluble material in the mold, subjecting the paste to the action of a liquid until it has set, removing the mold while supporting the molded paste in a liquid, and hardening the molded paste.

4. The method of molding which comprises placing a wood paste containing a soluble material in a mold, subjecting the paste to the action of a liquid until it has set, removing the mold from the molded paste, subjecting the molded paste to the action of a liquid until substantially all the volatile solvent in the paste is removed, and thereafter drying the molded paste.

5. The method of molding a wood paste which comprises mixing a soluble granular material with the wood paste, placing the paste in a mold, subjecting the paste to the action of a liquid until it has set, removing the mold from the molded paste, and hardening the molded paste.

6. The method of molding a wood paste which comprises mixing granular sodium chloride of about 60 mesh with the wood paste, placing the paste in a mold, subjecting the paste to the action of water until it has set, removing the mold from the molded paste, and hardening the molded paste.

7. The method of molding which comprises placing a wood paste containing a soluble material in a mold, subjecting the paste to the action of a liquid until it has set, removing the mold while supporting the molded paste in a liquid, subjecting the molded paste to the action of a liquid until substantially all the volatile solvent in the paste is removed, and thereafter drying the molded paste.

8. The method of molding which comprises saturating a porous mold with a liquid, placing a wood paste containing a soluble material in the mold, subjecting the paste to the action of a liquid until it has set, removing the mold from the molded paste, subjecting the molded paste to the action of a liquid until substantially all the volatile solvent in the paste is removed, and thereafter drying the molded paste.

9. The method of molding a wood paste which comprises mixing a granular sodium chloride of about 60 mesh with the wood paste, placing the wood paste in a mold, subjecting the paste to the action of water until it has set, removing the mold from the molded paste, subjecting the molded paste to the action of water until substantially all the volatile solvent in the paste is removed, and thereafter drying the molded paste.

10. The method of molding which comprises saturating a porous mold with water, mixing a granular sodium chloride of about 60 mesh with the wood paste, placing the wood paste in the mold, submerging the mold in water until the paste has set, removing the mold from the molded paste, subjecting the molded paste to the action of water until substantially all the volatile solvent in the paste is removed, and thereafter drying the molded paste.

AULETES CLARK HAIGHT.